United States Patent [19]

Wright

[11] 4,348,468

[45] Sep. 7, 1982

[54] BETA ALUMINA SOLID ELECTROLYTE MATERIAL AND ITS MANUFACTURE AND ELECTROCHEMICAL CELLS OR OTHER ENERGY CONVERSION DEVICES CONTAINING SUCH MATERIAL

[75] Inventor: Michael L. Wright, Allestree, England

[73] Assignee: Chloride Silent Power Limited, London, England

[21] Appl. No.: 217,333

[22] Filed: Dec. 17, 1980

[30] Foreign Application Priority Data

Dec. 28, 1979 [GB] United Kingdom ................ 7944410

[51] Int. Cl.$^3$ .......................................... H01M 10/39
[52] U.S. Cl. ..................................... 429/193; 427/123
[58] Field of Search ................. 429/104, 193; 427/123

[56] References Cited

U.S. PATENT DOCUMENTS 3,963,522  6/1976  Shigenori ........................... 429/193

FOREIGN PATENT DOCUMENTS 48-26894  8/1973  Japan ................................. 429/104
1511152   5/1978  United Kingdom .

Primary Examiner—Donald L. Walton
Attorney, Agent, or Firm—Beveridge, DeGrandi and Kline

[57] ABSTRACT

In a sodium sulphur cell or other electrochemical cell or energy conversion device in which beta-alumina is used as a solid electrolyte in contact with liquid sodium, improved wetting of the electrolyte by the sodium is obtained by coating the electrolyte, on the surface in contact with the sodium, with a metal, such as lead or bismuth, which will form an alloy with sodium. Conveniently the electrolyte is coated with an aqueous solution of lead acetate, dried and the lead acetate decomposed by heating to leave a lead coating.

3 Claims, No Drawings

BETA ALUMINA SOLID ELECTROLYTE MATERIAL AND ITS MANUFACTURE AND ELECTROCHEMICAL CELLS OR OTHER ENERGY CONVERSION DEVICES CONTAINING SUCH MATERIAL

BACKGROUND OF THE INVENTION

1. Field of the Invention

This invention relates to beta alumina electrolyte material and its manufacture and to electrochemical cells (particularly sodium sulphur cells) and other energy conversion devices employing such material.

Beta alumina electrolyte material is used as a solid electrolyte in electrochemical cells and other energy-conversion devices as a material through which sodium ions can pass. A typical example of such a cell is a sodium sulphur cell; in this case the beta alumina separates molten sodium from a cathodic reactant comprising sulphur and sodium polysulphides. During the operation of sodium sulphur cells, difficulty is sometimes encountered in wetting the beta alumina electrolyte surface with sodium. This can be overcome in some instances, by heating the beta alumina to a high temperature, for example in excess of 400° C.

The present invention is concerned with improving the wetting of beta-alumina by sodium more reliably and reproducibly at lower temperatures for example 350° C. which is a typical cell operating temperature.

2. Prior Art

It is known to provide capillary means on or adjacent the surface of the electrolyte material which is exposed to the sodium for drawing the liquid sodium over the surface of the solid electrolyte. In particular, it is known, for example from British Pat. No. 1511152, to provide a porous coating over the surface of the electrolyte; such a coating may be a metal coating such as a nickel or aluminium coating which may be applied for example by a plasma spray process.

Improving the wetting of the beta-alumina electrolyte provides a partial solution to the problem of the rise in electrical resistance which has often been found to occur during the operational life of a cell. This resistance rise is a change in the asymmetry of the cell resistance with time and/or cycles of charge and discharge. Only the discharge resistance increases; the charge resistance remains substantially constant. The cause of this resistance rise is not fully understood. It depends, inter alia, on the composition of the beta-alumina and appears to be primarily an interfacial effect at the interface between the electrolyte material and sodium anode.

BRIEF SUMMARY OF THE INVENTION

According to the present invention there is provided a beta-alumina solid electrolyte element which has had at least a part of its surface pre-treated with a metal that will form an alloy with sodium. For use in a cell or other energy-conversion device having a predetermined operating temperature, this metal is preferably a metal which will form, with sodium, an alloy with a melting point below said predetermined operating temperature of the cell or other energy-conversion device in which the electrolyte is to be used. Typically this temperature may be 350° C. However, it is possible to operate sodium-sulphur cells at higher temperatures and more generally for use in such a cell, the metal is one which will form an alloy with sodium having a melting point below 450° C., provided the cell is operated at a temperature above the melting point of the alloy. It is convenient to use lead as the metal. It will be understood that the metal must not be deleterious to any component in the sodium side of the cell or other energy-conversion device in which the electrolyte is used. In particular, the metal must be one which will not alter the lattice parameters of the beta-alumina sufficiently to fracture the ceramic; for this reason potassium and lithium cannot be used.

The invention thus furthermore includes within its scope an electrochemical cell or other energy-conversion device employing beta-alumina solid electrolyte material and molten sodium wherein the electrolyte material has been pre-treated, at least over part of the surface area thereof exposed to the molten sodium in the cell or energy-conversion device, with a metal, e.g. lead, that will form an alloy with sodium.

The invention furthermore includes within its scope a method of manufacture of a beta-alumina solid electrolyte element, suitable for use in an electrochemical cell or other energy-conversion device employing liquid sodium, which method includes the steps of pre-treating at least part of the surface area of the beta-alumina to be exposed to the liquid sodium with a metal that will form an alloy with sodium. Conveniently this metal is lead. Other metals which can conveniently be employed are tin and bismuth.

The pre-treatment may be chemical, for example by reducing a metal compound to the parent metal or it may be an electrochemical or electrophoretic deposition of the metal from a suitable solution or suspension or it may be physical treatment such as flame spraying, plasma spraying or vacuum deposition to deposit metal on said surface of the beta-alumina. Reduction of a metal compound to the parent metal may conveniently be effected by heat treatment using a metal compound which can be decomposed by heat to form the metal or by reduction with sodium metal.

DESCRIPTION OF THE PREFERRED EMBODIMENTS

The following is a description of a number of examples of the pre-treatment of a beta-alumina solid electrolyte element suitable for use in a sodium sulphur cell.

EXAMPLE 1

The beta-alumina electrolyte element was painted with a saturated aqueous solution of lead acetate over the surface region to be treated, this being the surface region which would be exposed to sodium in the cell. Excess moisture was then evaporated off and the lead acetate thermally decomposed by heating at 280° C. in an inert atmosphere, conveniently nitrogen.

In order to demonstrate the effect of this treatment, samples of untreated flat beta-alumina discs were heated under dry nitrogen gas to 350° C. Drops of sodium metal were placed on the surface and the wetting behaviour noted. At 350° C. the contact angle of the drop was greater than 90°; in other words the sodium did not wet the surface of the beta-alumina. As the temperature was increased the contact angle gradually decreased. When the same test was carried out on samples of beta-alumina having a surface treated as described above to deposit lead on the surface, it was observed that the drops of molten sodium would wet the surface and spread rapidly at temperatures as low as 280° C.

EXAMPLE 2

A number of sodium sulphur cells of cylindrical shape were constructed employing polycrystalline beta alumina ceramic tubes with sodium around the outside of the tube and sulphur/polysulphides within the tube, the cathodic reactant being impregnated in a carbon fibre material which filled the space between the electrolyte surface and an axially located current collector rod. Some of the tubes were treated with lead acetate by dipping them in a saturated aqueous solution and drying in an oven for 1 hour. After drying the tube was assembled into a cell and the lead acetate decomposed in situ during thermal activation of the cell. Results for 49 cells constructed in this way are shown in Table 1 below.

TABLE 1
EFFECT OF LEAD ACETATE TREATMENT ON RATE OF RESISTANCE RISE

| Resistance Rise mΩ/Cycle | No of Cells | % of Population | Resistance rise ohm cm$^2$/100 Cycles |
|---|---|---|---|
| 0.01 | 25 | 50 | 0.1 |
| 0.01–0.1 | 16 | 33 | 0.1–1.0 |
| 0.1–1.0 | 5 | 10 | 1.0–10 |
| 1.0–10.0 | 3 | 6 | 10–100 |
| Mean 0.3 mΩ/cycle | | 1.3Ωcm$^2$/100 cycles | |
| Standard Deviation 0.43 mΩ/cycle | | 4.3Ωcm$^2$/100 cycles | |

It will be seen that half the cells showed a resistance rise of 0.1 ohm cm$^2$ per 100 cycles, a third had a resistance rise >0.1 and <1.0 ohm cm$^2$ and the remainder >1 ohm cm$^2$. The reason for this variability is not known. Although a significant reduction in the rate of resistance rise was obtained by treating the ceramic with lead acetate, there were indications that the life of the electrolyte was being reduced.

EXAMPLE 3

To investigate this, twentytwo identical cells, all containing electrolyte from the same powder batch were constructed. In ten of the cells the electrolyte was treated with lead acetate whilst the remaining tubes remained untreated. The cells were the BR16 reduced seal diameter type. The sulphur electrode was fabricated using RVC 4000 felt (a carbon material). The current collector was friction welded aluminium rod, 9 mm O.D. coated with nichrome by flame spraying. The active surface area was 90 cm$^2$, and the capacity was 38 Ah.

As expected the control cells containing untreated electrolyte rose rapidly in resistance, whilst those with treated electrolyte did not (Table 2). To allow continued cycling of the control cells their sodium electrodes were renewed after 20 cycles. All 12 cells exhibited the usual fall in resistance, but six cells started to increase in resistance again and it was necessary to change the sodium electrodes in these cells again after a further 60 cycles.

Seven cells with lead acetate treated electrolyte have suffered electrolyte failure and the mean time to failure was 230 cycles.

TABLE 2
RESISTANCE RISE DATA FOR CELLS CONTAINING ELECTROLYTE TREATED WITH LEAD ACETATE AND UNTREATED ELECTROLYTE

| Cell Type | Cell No | Initial Resistance Milliohms | Milliohms/cycle | Rate of Resistance Rise Over First 20 Cycles ohm cm$^2$/100 cycles |
|---|---|---|---|---|
| Treated | 4716 | 18.2 | 0.074 | 0.67 |
| Treated | 4741 | 16.6 | 0.039 | 0.35 |
| Treated | 4743 | 15.3 | −0.043 | −0.39 |
| Treated | 4745 | 16.1 | −0.030 | −0.27 |
| Treated | 4747 | 14.3 | 0.030 | 0.27 |
| Treated | 4749* | 15.3 | 0.0 | 0 |
| Treated | 4751 | 13.7 | 0.0 | 0 |
| Treated | 4753 | 15.5 | −0.052 | −0.47 |
| Treated | 4756 | 14.9 | 0.087 | 0.78 |
| Treated | 4751 | 15.3 | 0.378 | 3.40 |
| Untreated | 4719 | 27.5 | 2.52 | 22.7 |
| Untreated | 4742 | 33.0 | 1.81 | 16.3 |
| Untreated | 4744 | 17.3 | 2.06 | 18.5 |
| Untreated | 4746 | 20.7 | 1.75 | 15.8 |
| Untreated | 4748 | 25.3 | 1.72 | 15.5 |
| Untreated | 4750 | 28.2 | 2.38 | 21.4 |
| Untreated | 4752 | 23.3 | 3.33 | 30.0 |
| Untreated | 4754 | 18.7 | 2.83 | 25.5 |
| Untreated | 4757 | 30.2 | 1.77 | 15.9 |
| Untreated | 4759 | 34.3 | 2.03 | 18.3 |
| Untreated | 4760 | 19.2 | 1.76 | 15.8 |
| Untreated | 4793 | 32.0 | 1.55 | 14.0 |

*Failed on 17th cycle.

EXAMPLE 4

Cells were constructed as in Example 2 but the beta-alumina material, instead of being treated with lead acetate, was coated with metallic bismuth by vacuum deposition. The results of this test are shown in Table 3 below. The batches 121 M and 122 M of material used for forming the electrolyte in six of the seven cells in this example were batches known to give a large resistance rise in untreated cells. Table 4 gives the results of tests with cells in which the electrolyte material was coated, by vapour deposition, with metallic tin, and Table 5, for comparison purposes, shows results on similar cells with untreated electrolyte material.

TABLE 3
VAPOUR DEPOSITED BISMUTH COATING

| Cell No. | Material | Initial Resistance | Final Resistance | No of Cycles in test |
|---|---|---|---|---|
| 4692 | 108.1 | 18 m.ohms | 25 m.ohms | 131 |
| 5599 | 121 M | 19 m.ohms | 50 m.ohms | 29 |
| 5596 | 121 M | 19 m.ohms | 57 m.ohms | 49 |
| 5574 | 121 M | 47 m.ohms | 127 m.ohms | 18 |
| 5571 | 121 M | 23 m.ohms | 81 m.ohms | 7 |
| 5604 | 122 M | 24 m.ohms | 70 m.ohms | 20 |
| 5550 | 121 M | 23 m.ohms | 47 m.ohms | 90 |

TABLE 4
VAPOUR DEPOSITED TIN COATING

| Cell No. | Material | Initial Resistance milliohms | Resistance milliohms | No. of cycles in test initial | Final Resistance milliohms | No. of cycles in complete test |
|---|---|---|---|---|---|---|
| 5598 | 121 M | 21 | 49 | 21 | 109 | 31 |
| 5591 | 121 M | 20 | 55 | 17 | 140 | 32 |
| 5555 | 121 M | 20 | 55 | 17 | | |
| 5589 | 122.9 | 23 | 40 | 9 | | |

TABLE 4-continued

VAPOUR DEPOSITED TIN COATING

| Cell No. | Material | Initial Resistance milliohms | Resistance milliohms | No. of cycles in test initial | Final Resistance milliohms | No.of cycles in complete test |
| --- | --- | --- | --- | --- | --- | --- |
| 5590 | 122.9 | 21 | 33 | 17 | 93 | 34 |
| 5601 | 122 M | 17 | 67 | 49 | | |

TABLE 5

UNTREATED CONTROL CELLS

| Cell No. | Material | Initial Resistance milliohms | Resistance after cycling milliohms | No. of cycles in initial test | Final Resistance milliohms | Total no. of cycles |
| --- | --- | --- | --- | --- | --- | --- |
| 5602 | 121 M | 19 | 47 | 35 | 57 | 49 |
| 5576 | 121 M | 24 | 81 | 14 | | |
| 5575 | 121 M | 66 | 114 | 7 | | |
| 5558 | 121 M | 77 | 78 | 2 | | |
| 5527 | 121 M | 72 | 89 | 3 | | |
| 5600 | 122 M | 26 | 76 | 35 | | |
| 5595 | 122 3 | 19 | 243 | 31 | | |

I claim:

1. A method of manufacture of a beta-alumina solid electrolyte element, suitable for use in an electrochemical cell or other energy-conversion device employing liquid sodium, which method includes the steps of pretreating at least part of the surface area of the beta-alumina to be exposed to the liquid sodium with a lead compound and reducing the lead compound to metallic lead.

2. A method as claimed in claim 1 wherein the beta-alumina is coated with an aqueous solution of lead acetate and wherein, after drying, the lead acetate is reduced by heating.

3. A beta-alumina solid electrolyte element made by the method of claim 1.

* * * * *